(12) United States Patent
Wang

(10) Patent No.: US 9,600,328 B2
(45) Date of Patent: Mar. 21, 2017

(54) METHOD AND APPARATUS FOR PROCESSING BACKGROUND VISUAL EFFECT

(75) Inventor: Xiang Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 478 days.

(21) Appl. No.: 14/394,579

(22) PCT Filed: Nov. 28, 2011

(86) PCT No.: PCT/CN2011/083058
§ 371 (c)(1),
(2), (4) Date: Nov. 21, 2014

(87) PCT Pub. No.: WO2012/159430
PCT Pub. Date: Nov. 29, 2012

(65) Prior Publication Data
US 2015/0286498 A1    Oct. 8, 2015

(30) Foreign Application Priority Data

May 23, 2011   (CN) .......................... 2011 1 0134034

(51) Int. Cl.
*G06F 9/46*        (2006.01)
*G06F 9/48*        (2006.01)
(Continued)

(52) U.S. Cl.
CPC ............ *G06F 9/485* (2013.01); *G06F 9/461* (2013.01); *G06F 9/4881* (2013.01); *G06T 1/20* (2013.01);
(Continued)

(58) Field of Classification Search
CPC ................................ G06F 9/4881; G06F 9/461
(Continued)

(56) References Cited

U.S. PATENT DOCUMENTS 5,892,991 A *  4/1999 Hamada ................. G03B 17/20
                                                      396/147
6,248,944 B1 *  6/2001 Ito ........................... G09B 15/02
                                                      386/280
(Continued)

FOREIGN PATENT DOCUMENTS

CN          1492594 A       4/2004
CN          1592455 A       3/2005
(Continued)

OTHER PUBLICATIONS

P752International Search Report in international application No. PCT/CN2011/083058, mailed on Mar. 8, 2012.
(Continued)

*Primary Examiner* — Phillip H Nguyen
(74) *Attorney, Agent, or Firm* — Oppedahl Patent Law Firm LLC

(57) ABSTRACT

Disclosed are a method and an apparatus for processing a background visual effect. The method is registering dependence resources, running parameters and handlers corresponding to respective visual effect modes of a background, selecting a visual effect mode corresponding to the background according to a running instruction, and initializing the dependence resource, the running parameter and the handler corresponding to the selected visual effect mode to control the background to enter the running status of the selected visual effect mode, and switching the current running visual effect mode of the background according to a received switching instruction. Through the method and the apparatus for processing a background visual effect, background visual effects can be shared in different scenarios, the variety of background visual effects which can be implemented in the same scenario is enriched and the effect of user experience is improved.

5 Claims, 12 Drawing Sheets

(51) Int. Cl.
 *H04N 5/262* (2006.01)
 *G06T 1/20* (2006.01)

(52) U.S. Cl.
 CPC ......... *H04N 5/262* (2013.01); *G06T 2200/28* (2013.01)

(58) Field of Classification Search
 USPC .................................................. 718/107, 108
 See application file for complete search history.

(56) References Cited

U.S. PATENT DOCUMENTS

| | | | |
|---|---|---|---|
| 7,598,945 | B2 | 10/2009 | Lee |
| 9,355,079 | B2* | 5/2016 | Harrison |
| 2004/0080518 | A1 | 4/2004 | Lee |
| 2004/0100479 | A1* | 5/2004 | Nakano ................ G06F 1/1626 715/700 |
| 2005/0204299 | A1* | 9/2005 | Matsui ................... G06T 11/00 715/764 |
| 2006/0221091 | A1* | 10/2006 | Pearson ............... G06F 9/4443 345/589 |
| 2006/0276234 | A1* | 12/2006 | Kang .................... G06F 17/214 455/566 |
| 2007/0132746 | A1* | 6/2007 | Wang ................ H04M 1/72544 345/204 |
| 2007/0250787 | A1* | 10/2007 | Kawahara ............ G06F 9/4443 715/782 |
| 2008/0026690 | A1* | 1/2008 | Foxenland ............ G10H 1/368 455/3.06 |
| 2008/0082926 | A1* | 4/2008 | Reponen ............... G06F 9/4443 715/744 |
| 2008/0184100 | A1* | 7/2008 | Selig .................... G06F 17/243 715/225 |
| 2008/0184102 | A1* | 7/2008 | Selig .................... G06F 17/243 715/234 |
| 2008/0318634 | A1 | 12/2008 | Wong |
| 2010/0008650 | A1* | 1/2010 | Bull .................... H04N 21/4126 386/200 |
| 2010/0090971 | A1* | 4/2010 | Choi .................... G06F 3/04883 345/173 |
| 2011/0302510 | A1* | 12/2011 | Harrison ............. G06F 17/2247 715/760 |
| 2011/0302524 | A1* | 12/2011 | Forstall ............ G06F 17/30905 715/781 |
| 2012/0151415 | A1* | 6/2012 | Park .................... G06F 3/04883 715/835 |
| 2014/0253478 | A1* | 9/2014 | Jeong ...................... G06F 3/016 345/173 |

FOREIGN PATENT DOCUMENTS

| | | |
|---|---|---|
| CN | 101032184 A | 9/2007 |
| CN | 101281740 A | 10/2008 |
| CN | 101330755 A | 12/2008 |
| CN | 101702098 A | 5/2010 |
| CN | 101706718 A | 5/2010 |
| CN | 101963894 A | 2/2011 |
| CN | 102231805 A | 11/2011 |

OTHER PUBLICATIONS

English Translation of the Written Opinion of the International Search Authority in international application No. PCT/CN2011/083058, mailed on Mar. 8, 2012.

* cited by examiner

METHOD AND APPARATUS FOR PROCESSING BACKGROUND VISUAL EFFECT

TECHNICAL FIELD

The disclosure relates to the technical field of communications, in particular to a method and an apparatus for processing a background visual effect.

BACKGROUND

With the constant development of the mobile embedded technology, the function of a mobile hand-held terminal is becoming increasingly diverse. In recent years, manufacturers make every effort to enrich the function and application of the mobile hand-held terminal and further make a great improvement on the visual effect, so as to meet the effect of user experience. Various mobile terminal products in the market vary slightly in the function and the price, and the final factor of determining whether the product can attract users is always the interface and the interactive way of the product. A user interface of a product gives the first impression to a user and always determines the degree of preference of the user to the product.

However, in the existing technology, different background visual effect functions are distributed in different modules, and each background visual effect function module is applied to one scenario, in which the background visual effect is simple and the effect of user experience is poor.

SUMMARY

The disclosure provides a method and an apparatus for processing a background visual effect so as to share background visual effects in different scenarios, enrich the variety of background visual effects which can be implemented in the same scenario and improve the effect of user experience.

The disclosure provides a method for processing a background visual effect, including that:

dependence resources, running parameters and handlers corresponding to respective visual effect modes of a background are registered;

a visual effect mode corresponding to the background is selected according to a running instruction, and the dependence resource, the running parameter and the handler corresponding to the selected visual effect mode are initialized to control the background to enter the running status of the selected visual effect mode; and the current running visual effect mode of the background is switched according to a received switching instruction.

Preferably, the step that the dependence resources, the running parameters and the handlers corresponding to respective visual effect modes of the background are registered may include that:

the dependence resources corresponding to respective visual effect modes of the background are acquired and are added to a dependence resource list maintained by a system memory;

the running parameters corresponding to respective visual effect modes of the background are acquired and are added to a running parameter list maintained by the system memory; and the handlers corresponding to respective visual effect modes of the background are acquired and are added to a handler list maintained by the system memory.

Preferably, the step that the current running visual effect mode of the background is switched according to a received switching instruction may include:

whether a target visual effect mode of the background is available is judged according to the received switching instruction;

if available, the original visual effect mode which is currently running is switched to the target visual effect mode; and if not available, a flag is set for indicating that the target visual effect mode is unavailable and the running status of the original visual effect mode of the background is maintained.

Preferably, the step that the original visual effect mode which is currently running is switched to the target visual effect mode may include that:

when the original visual effect mode currently running is available, the original visual effect mode is terminated and the target visual effect mode is started and is run; and when the original visual effect mode currently running is unavailable, the target visual effect mode is started.

The disclosure further provides an apparatus for processing a background visual effect, including:

a registration module, which is configured to register dependence resources, running parameters and handlers corresponding to respective visual effect modes of a background;

a running module, which is configured to select a visual effect mode corresponding to the background according to a running instruction and initialize the dependence resource, the running parameter and the handler corresponding to the selected visual effect mode to control the background to enter the running status of the selected visual effect mode; and a switching module, which is configured to switch the current running visual effect mode of the background according to a received switching instruction.

Preferably, the registration module may be further configured to acquire the dependence resources corresponding to respective visual effect modes of the background and add them to a dependence resource list maintained by a system memory, acquire the running parameters corresponding to respective visual effect modes of the background and add them to a running parameter list maintained by the system memory, and acquire the handlers corresponding to respective visual effect modes of the background and add them to a handler list maintained by the system memory.

Preferably, the switching module may include:

a first judgment sub-module, which is configured to judge whether a target visual effect mode of the background is available according to the received switching instruction;

a switching sub-module, which is configured to switch the original visual effect mode currently running to the target visual effect mode when the target visual effect mode is available; and a maintenance sub-module, which is configured to set a flag for indicating that the target visual effect mode is unavailable and maintain the running status of the original visual effect mode of the background when the target visual effect mode is unavailable.

Preferably, the switching sub-module may be specifically configured to terminate the original visual effect mode and start and run the target visual effect mode when the original visual effect mode currently running is available, and to start the target visual effect mode when the original visual effect mode currently running is unavailable.

The disclosure further provides a method for processing a background visual effect, including the following steps that:

dependence resources, running parameters and handlers corresponding to respective visual effect modes of a background are registered;

a visual effect mode corresponding to the background is selected according to a running instruction, and the dependence resource, the running parameter and the handler corresponding to the selected visual effect mode are initialized to control the background to enter the running status of the selected visual effect mode; and a visual effect mode to be set for the background is set according to a received setting instruction.

Preferably, the step that dependence resources, running parameters and handlers corresponding to respective visual effect modes of a background are registered may include that:

the dependence resources corresponding to respective visual effect modes of the background are acquired and are added to a dependence resource list maintained by a system memory;

the running parameters corresponding to respective visual effect modes of the background are acquired and are added to a running parameter list maintained by the system memory; and the handlers corresponding to respective visual effect modes of the background are acquired and are added to a handler list maintained by the system memory.

Preferably, the step that a visual effect mode to be set for the background is set according to a received setting instruction may specifically include:

whether the visual effect mode to be set is in a running status is judged according to the received setting instruction;

if it is in a running status, the visual effect mode is stopped and the related information of the visual effect mode is set;

the visual effect mode is started; and if not in a running status, the related information of the visual effect mode is set.

Preferably, after the related information of the visual effect mode is set, the method may further include that:

whether the related information of the visual effect mode is set initially is judged; and if it is set initially, a flag is generated for indicating that the visual effect mode is set initially.

The disclosure further provides an apparatus for processing a background visual effect, including:

a registration module, which is configured to register dependence resources, running parameters and handlers corresponding to respective visual effect modes of a background;

a running module, which is configured to select a visual effect mode corresponding to the background according to a running instruction and initialize the dependence resource, the running parameter and the handler corresponding to the selected visual effect mode to control the background to enter the running status of the selected visual effect mode; and a setting module, which is configured to set a visual effect mode to be set for the background according to a received setting instruction.

Preferably, the registration module may be further configured to acquire the dependence resources corresponding to respective visual effect modes of the background and add them to a dependence resource list maintained by a system memory, acquire the running parameters corresponding to respective visual effect modes of the background and add them to a running parameter list maintained by the system memory, and acquire the handlers corresponding to respective visual effect modes of the background and add them to a handler list maintained by the system memory.

Preferably, the apparatus further includes:

a second judgment sub-module, which is configured to judge whether the visual effect mode to be set is in a running status according to the received setting instruction; and a setting sub-module, which is configured to stop the visual effect mode, set the related information of the visual effect mode and start the visual effect mode when the visual effect mode is in a running status, and to set the related information of the visual effect mode when the visual effect mode is in a non-running status.

Preferably, the setting module further may include:

a third judgement sub-module, which is configured to judge whether the related information of the visual effect mode is set initially, and if the related information of the visual effect mode is set initially, a flag indicative of initial setting is generated for the visual effect mode by the setting sub-module.

As can be seen from the above, through the methods and the apparatuses for processing the background visual effect, background visual effects can be shared in different scenarios, the variety of background visual effects which can be implemented in the same scenario is enriched and the effect of user experience is improved.

DETAILED DESCRIPTION

It should be understood that the embodiments herein are only intended to explain the disclosure instead of limiting the disclosure.

Figure 1:
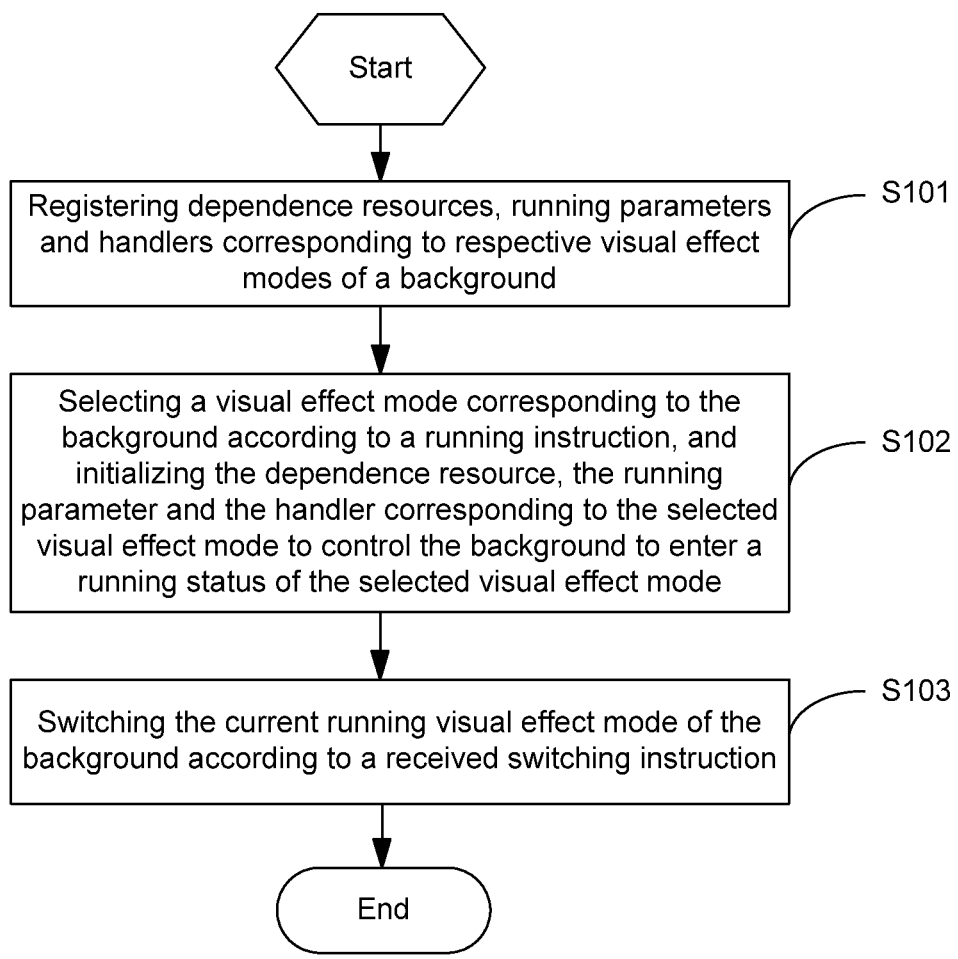
FIG. 1 is a flowchart of a method for processing a background visual effect in an embodiment of the disclosure.

See FIG. 1, a method for processing a background visual effect is provided in an embodiment of the disclosure, including that:

Step S101: dependence resources, running parameters and handlers corresponding to respective visual effect modes of a background are registered;

Step S102: a visual effect mode corresponding to the background is selected according to a running instruction, and the dependence resources, the running parameters and the handlers corresponding to the selected visual effect mode are initialized to control the background to enter a running status of the selected visual effect mode; and Step S103: the current running visual effect mode of the background is switched according to a received switching instruction.

In the embodiment of a method for processing a background visual effect, the dependence resources, the running parameters and the handlers corresponding to respective visual effect modes of the background are registered, and when a visual effect mode of the background runs, the visual effect mode of the background may be switched according to the requirements of a user, so that background visual effects may be shared in different scenarios and the effect of user experience is improved.

Furthermore, in the embodiment of a method for processing a background visual effect, Step 101 specifically includes that: the dependence resources corresponding to respective visual effect modes of the background are acquired and are added to a dependence resource list maintained by a system memory, the running parameters corresponding to respective visual effect modes of the background are acquired and are added to a running parameter list maintained by the system memory, and the handlers corresponding to respective visual effect modes of the background are acquired and are added to a handler list maintained by the system memory.

Figure 2:
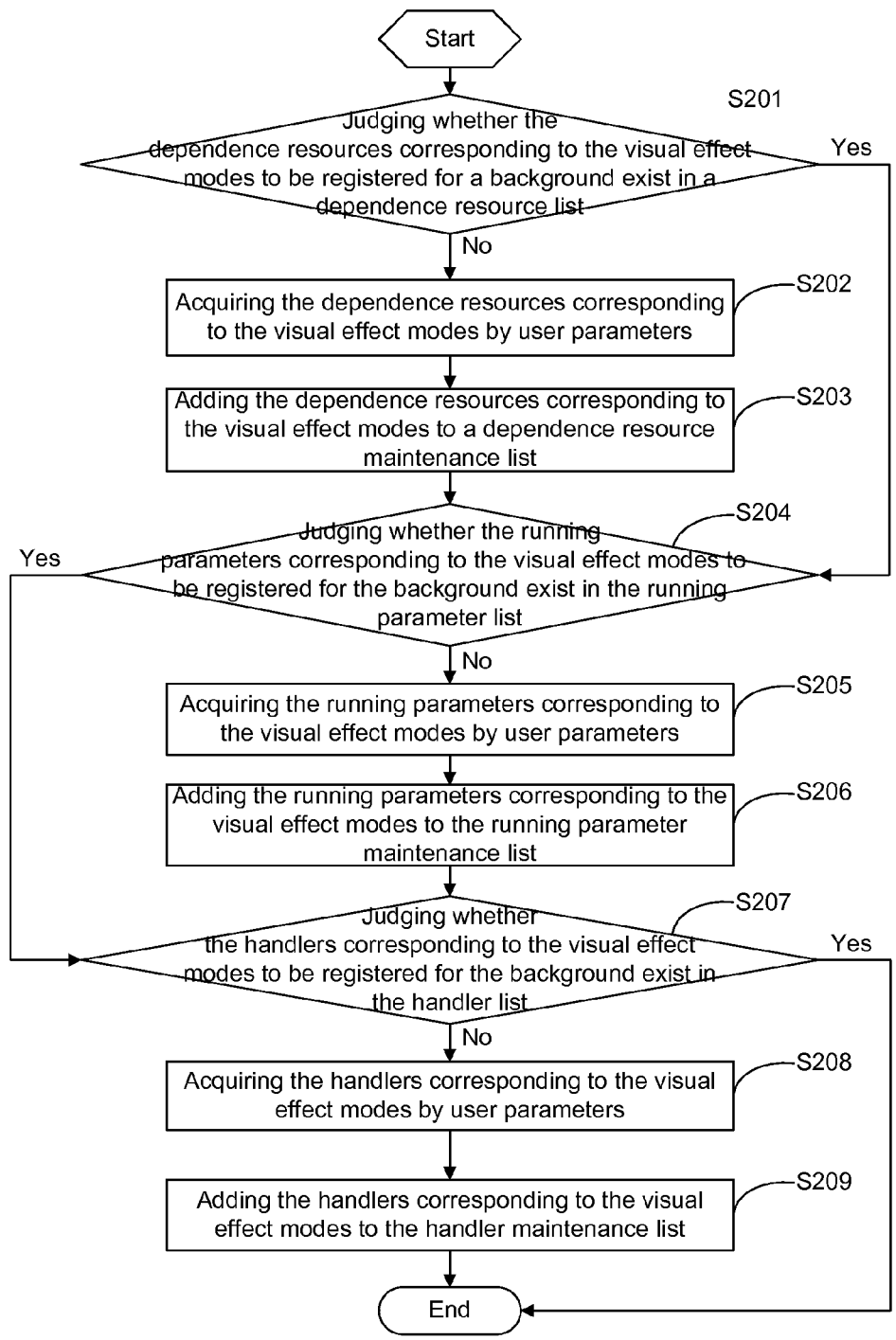
FIG. 2 is another flowchart of a method for processing a background visual effect in an embodiment of the disclosure.

In the embodiment of a method for processing a background visual effect, when a dependence resource corresponding to a certain visual effect mode already exists in the dependence resource list, it is unnecessary to acquire the dependence resource again and add the dependence resource to the dependence resource list. Similarly, when a running parameter corresponding to a certain visual effect mode already exists in the running parameter list, it is unnecessary to acquire the running parameter again and add the running parameter to the running parameter list; and when a handler corresponding to a certain visual effect mode already exists in the handler list, it is unnecessary to acquire the handler again and add the handler to the handler list. Namely, before dependence resources, running parameters and handlers are acquired, it is necessary to judge whether the corresponding dependence resources, the corresponding running parameters and the corresponding handlers exist in the corresponding lists. See FIG. 2, the specific processing is as follows:

Step S201: whether a dependence resource corresponding to a visual effect mode to be registered for a background exists in a dependence resource list is judged; if not exist, Step S202 is executed; and if exist, Step S204 is executed;

Step 202: the dependence resource corresponding to the visual effect mode is acquired by a user parameter;

Step S203: the dependence resource corresponding to the visual effect mode is added to a dependence resource list;

Step S204: whether a running parameter corresponding to the visual effect mode to be registered for the background exists in the running parameter list is judged; if not exist, Step S205 is executed; and if exist, Step S207 is executed;

Step S205: the running parameter corresponding to the visual effect mode is acquired by a user parameter;

Step S206: the running parameter corresponding to the visual effect mode is added to the running parameter list;

Step S207: whether a handler corresponding to the visual effect mode to be registered for the background exists in the handler list is judged; if not exist, Step S208 is executed; and if exist, the registration flow is ended.

Step S208: the handler corresponding to the visual effect mode is acquired by a user parameter; and Step S209: the handler corresponding to the visual effect mode is added to the handler maintenance list.

The dependence resource maintenance list, the running parameter maintenance list and the handler maintenance list are maintained in a system memory.

Figure 3:
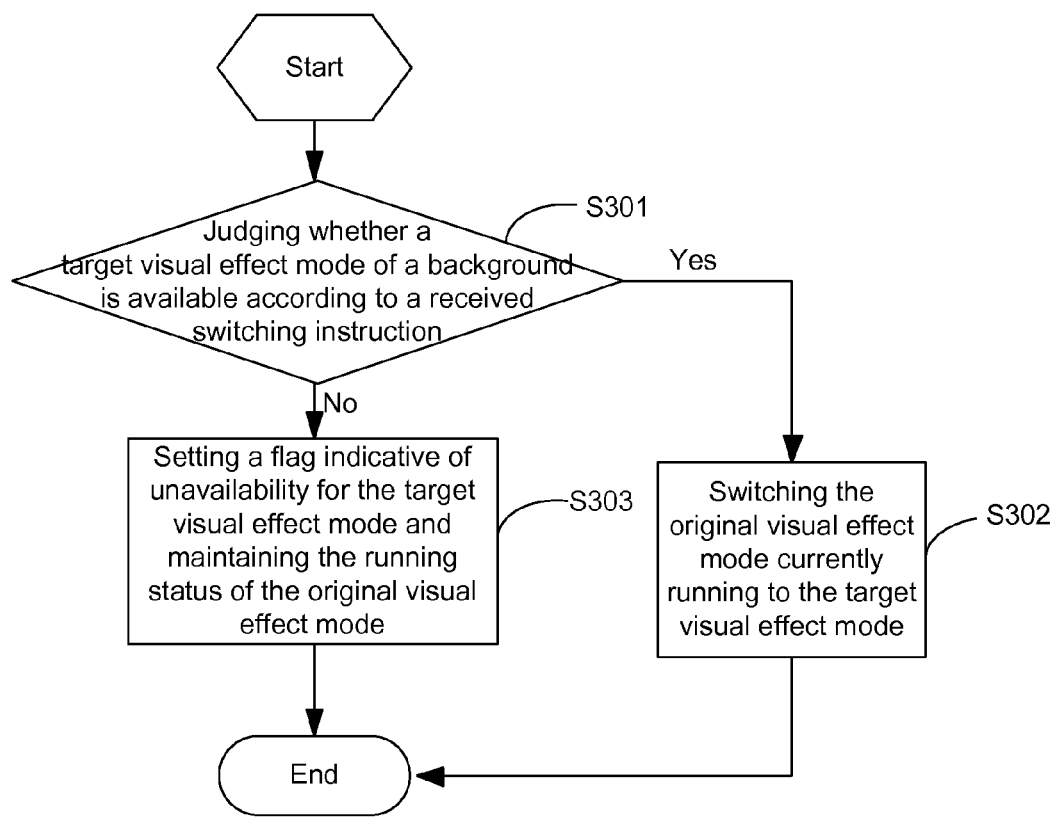
FIG. 3 is another flowchart of a method for processing a background visual effect in an embodiment of the disclosure.

Furthermore, see FIG. 3, in the embodiment of a method for processing a background visual effect, Step 103 specifically includes that:

Step S301: according to a received switching instruction, whether a target visual effect mode of a background is available is judged; if available, Step S302 is executed; and if not, Step S303 is executed;

Step S302: the original visual effect mode which is currently running is switched to the target visual effect mode; and Step S303: an unavailable flag is set for the target visual effect mode and the running status of the original visual effect mode is maintained.

The switching instruction is generated according to switching information input by a user or according to switching information received wirelessly.

Furthermore, in the embodiment of a method for processing a background visual effect, the step that the original visual effect mode which is currently running is switched to the target visual effect mode may specifically include that: when the original visual effect mode currently running is available, the original visual effect mode is terminated and the target visual effect mode is started; when the original visual effect mode currently running is unavailable, the target visual effect mode is started.

Figure 4:
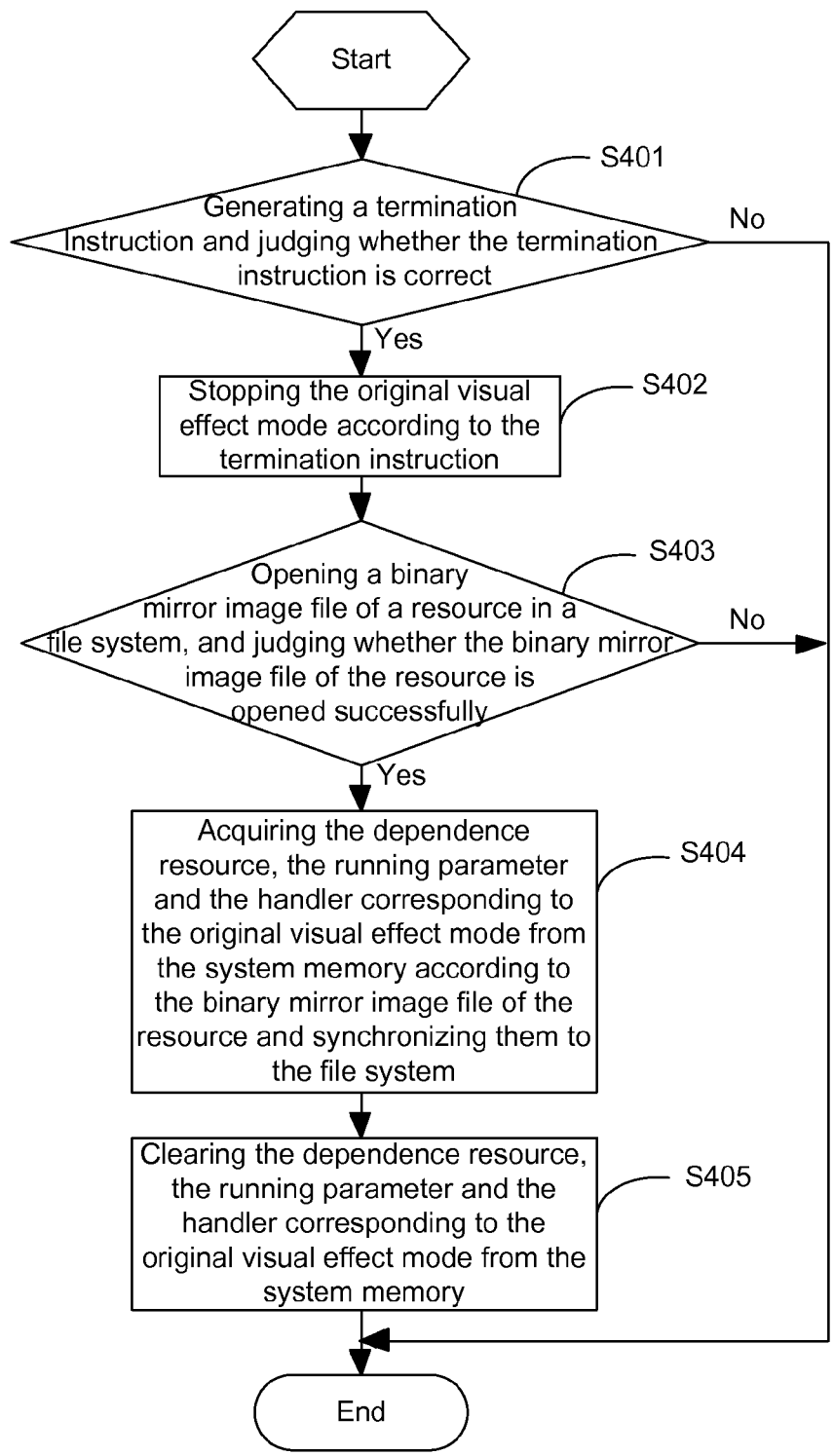
FIG. 4 is another flowchart of a method for processing a background visual effect in an embodiment of the disclosure.

Furthermore, see FIG. 4, in the embodiment of a method for processing a background visual effect, the step that the original visual effect mode is terminated may specifically include that:

Step S401: a termination instruction is generated and whether the termination instruction is correct is judged; if correct, Step 402 is executed; and if not, the flow is ended;

a first parameter of a background visual effect is maintained in a system memory and may include a first parameter of each visual effect mode. The first parameter of each visual effect mode includes the following contents: an original image path of a resource, a binary mirror image path of the resource, an image type of the resource and the variety of a handler corresponding to the visual effect mode. When the original visual effect mode currently running needs to be terminated, a system acquires the first parameter of the original visual effect mode currently running and generates a termination instruction according to the first parameter of the original visual effect mode;

Step S402: the original visual effect mode is stopped according to the termination instruction;

Step S403: a binary mirror image file of the resource in a file system is opened, and whether the binary mirror image file of the resource is opened successfully is judged; if successful, Step S204 is executed; and if not, the flow is ended;

the binary mirror image file of the resource includes the address of an original handler, and the addresses of the dependence resource and running parameter corresponding to the original handler in the system memory;

Step S404: the dependence resource, the running parameter and the handler corresponding to the original visual effect mode are acquired from the system memory according to the binary mirror image file of the resource and are synchronized to the file system; and Step S405: the dependence resource, the running parameter and the handler corresponding to the original visual effect mode are cleared from the system memory.

The handler is the current running handler of the original visual effect mode before Step S402; and the dependence resource and the running parameter correspond to the handler.

Figure 5:
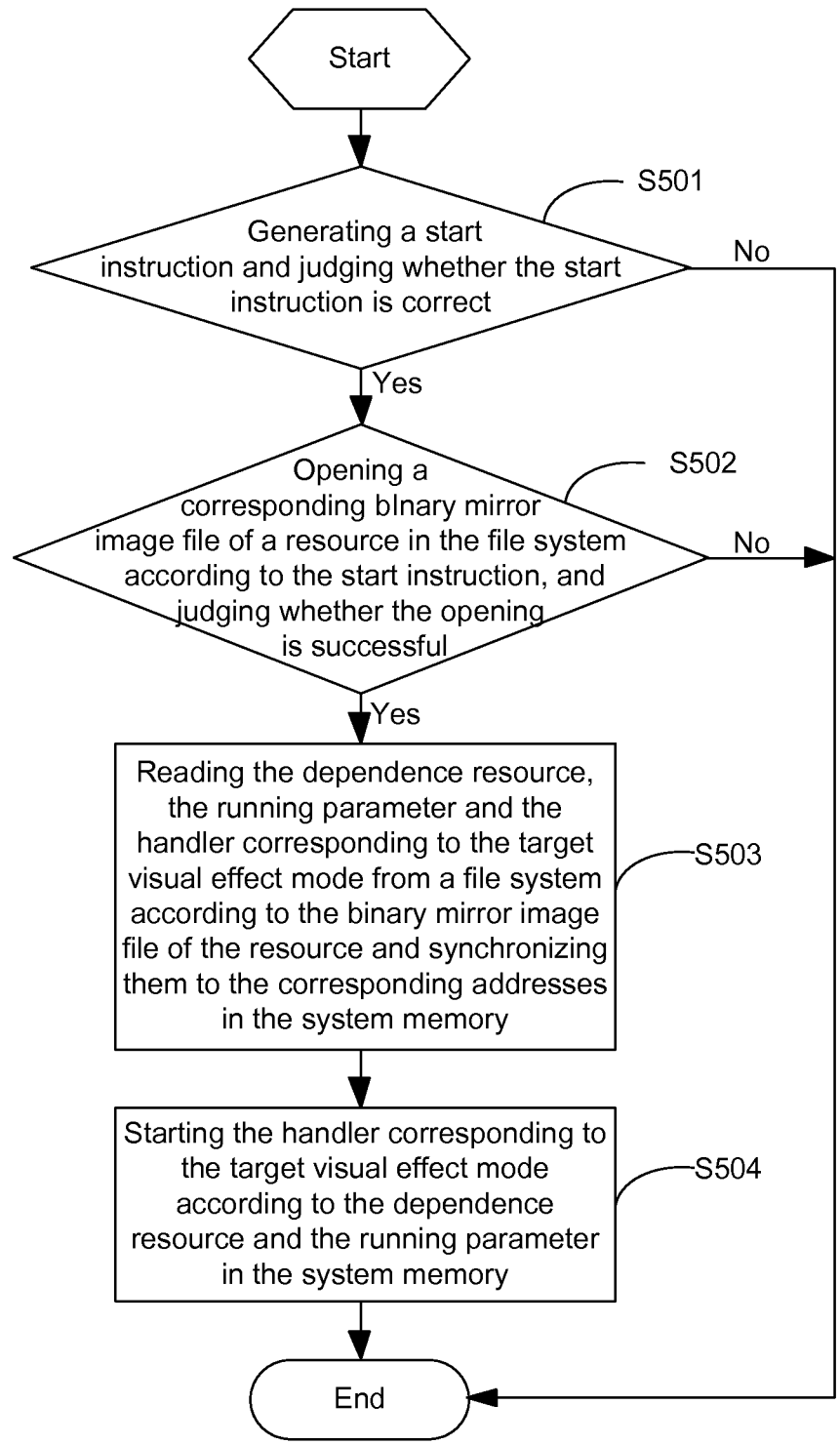
FIG. 5 is another flowchart of a method for processing a background visual effect in an embodiment of the disclosure.

Furthermore, see FIG. 5, in the embodiment of a method for processing a background visual effect, the step that the target visual effect mode is started may specifically include that:

Step S501: a start instruction is generated and whether the start instruction is correct is judged; if correct, Step S502 is executed; and if not, the flow is ended;

a first parameter of a background visual effect is maintained in the system memory and includes a first parameter of each visual effect mode, wherein the first parameter of each visual effect mode includes the following contents: an original image path of a resource, a binary mirror image path of the resource, an image type of the resource and the variety of a handler corresponding to the visual effect mode. Before the start instruction is executed, a user selects a visual effect mode in the first parameter of a background visual effect, and then selects a handler in the visual effect mode and the image path of the resource, the binary mirror image path of the resource and the image type of the resource corresponding to the handler, and the system generates the start instruction according to the selection of the user;

Step S502: a corresponding binary mirror image file of the resource in the file system is opened according to the start instruction, and whether the opening is successful is judged; if successful, Step S503 is executed; and if not, the flow is ended;

the binary mirror image file of the resource includes the address of a target handler, and the addresses of the dependence resource and running parameter corresponding to the target handler in the system memory;

Step S503: the dependence resource, the running parameter and the handler corresponding to the target visual effect mode are read from a file system according to the binary mirror image file of the resource and are synchronized to the corresponding addresses in the system memory;

Step S504: the handler corresponding to the target visual effect mode is started according to the dependence resource and the running parameter in the system memory.

In the embodiment of a method for processing a background visual effect, the background visual effect includes various visual effect modes each including a plurality of handlers. Running a visual effect mode is essentially to run a specific handler in the visual effect mode. Switching a visual effect mode is essentially to switch a handler currently running in a visual effect mode to a handler in another visual effect mode.

A visual effect mode corresponds to a plurality of visual effect objects each including a handler and a running parameter and a dependence resource corresponding to the handler.

Figure 6:
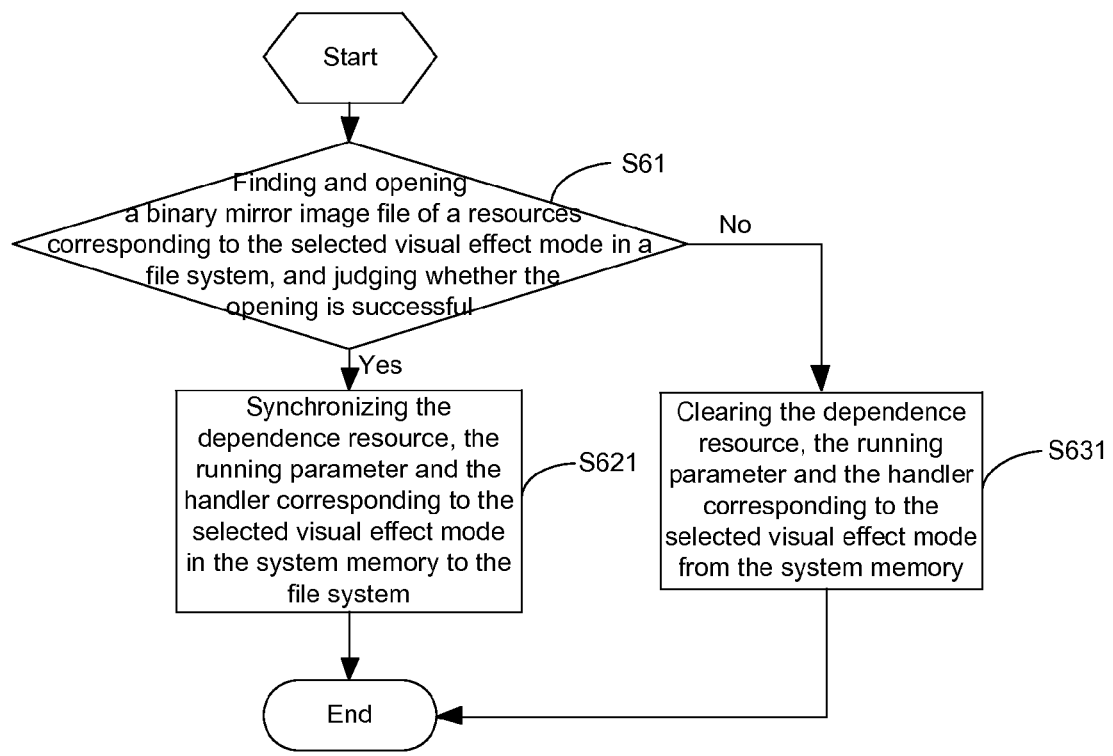
FIG. 6 is another flowchart of a method for processing a background visual effect in an embodiment of the disclosure.

Furthermore, see FIG. 6, in the embodiment of a method for processing a background visual effect, after the dependence resource, the running parameter and the handler corresponding to the selected visual effect mode are initialized, the method may further include that:

Step S61: a binary mirror image file of the resource corresponding to the selected visual effect mode is found and is opened in a file system, and whether the opening is successful is judged; if successful, Step S621 is executed; and if not, Step S631 is executed;

the binary mirror image file of the resource includes the address of a target handler and the addresses of the dependence resource and running parameter corresponding to the target handler in the system memory;

Step S621: the dependence resource, the running parameter and the handler corresponding to the selected visual effect mode in the system memory are synchronized to the file system; and Step S631: the dependence resource, the running parameter and the handler corresponding to the selected visual effect mode are cleared from the system memory.

In the embodiment of a method for processing a background visual effect, the background visual effect includes various visual effect modes and the running of each visual effect mode depends on the registration and the initialization of the corresponding visual effect mode; each visual effect mode includes a plurality of specific handlers; and running a visual effect mode is essentially to run a specific handler in the visual effect mode. Different handlers correspond to different related information.

Figure 7:
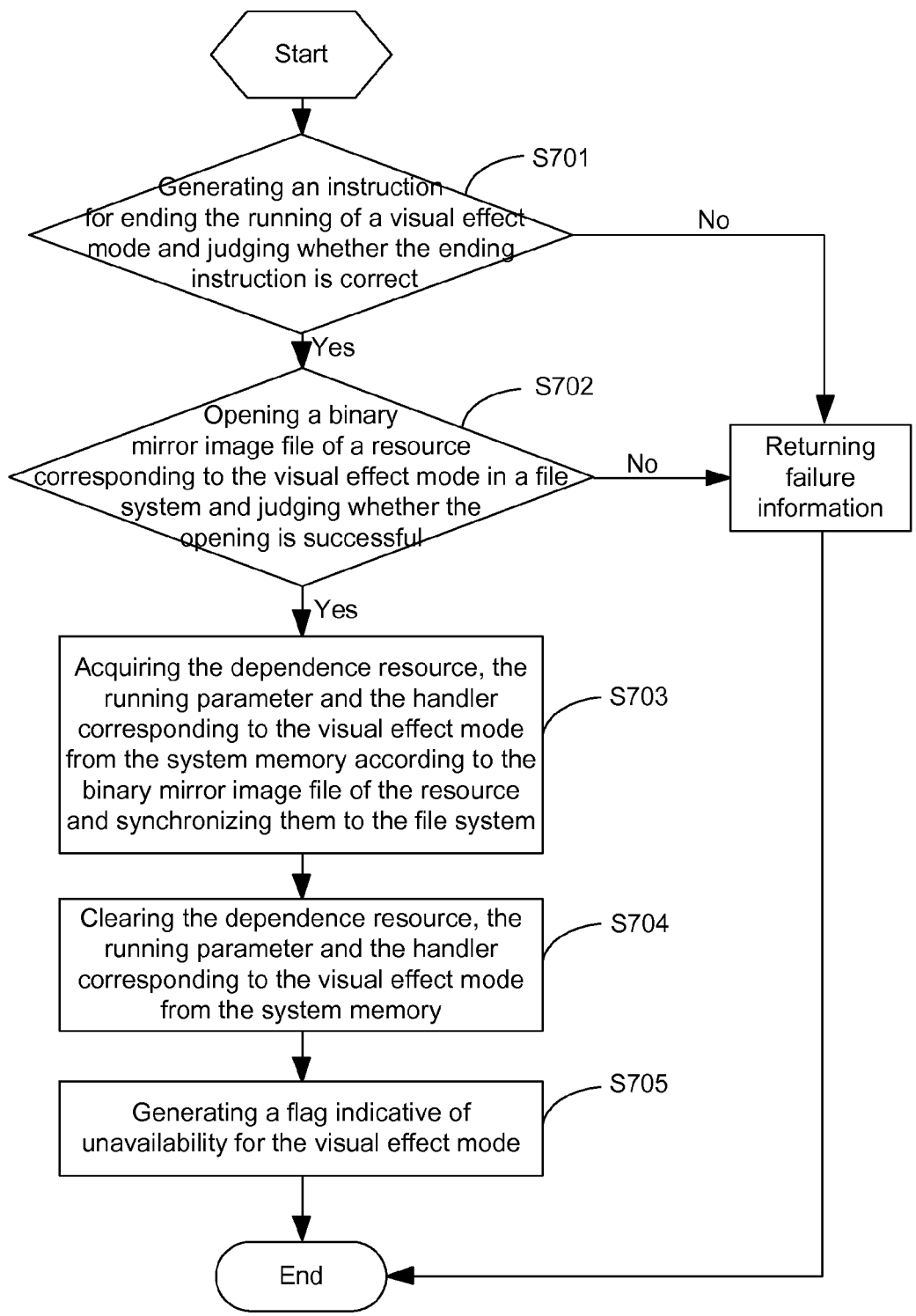
FIG. 7 is another flowchart of a method for processing a background visual effect in an embodiment of the disclosure.

Furthermore, see FIG. 7, in the embodiment of a method for processing a background visual effect, when it is necessary to end the running of a current running visual effect mode of a background, the method may include that:

Step S701: an instruction is generated for ending the running of a visual effect mode and whether the ending instruction is correct is judged; if correct, Step S702 is executed; and if not, failure information is generated and the flow is ended;

Step S702: a binary mirror image file of a resource corresponding to the visual effect mode in a file system is opened, and whether the opening is successful is judged; if successful, Step S703 is executed; and if not, failure information is generated and the flow is ended;

the binary mirror image file of the resource includes the address of a target handler, and the addresses of the dependence resource and running parameter corresponding to the target handler in the system memory;

Step S703: the dependence resource, the running parameter and the handlers corresponding to the visual effect mode are acquired from the system memory according to the binary mirror image file of the resource and are synchronized to the file system;

Step S704: the dependence resource, the running parameter and the handler corresponding to the visual effect mode are cleared from the system memory; and Step S705: an unavailable flag is generated for the visual effect mode.

As can be seen from the above, in the embodiment of a method for processing a background visual effect, background visual effects can be shared in different scenarios and the effect of user experience is improved.

Figure 8:
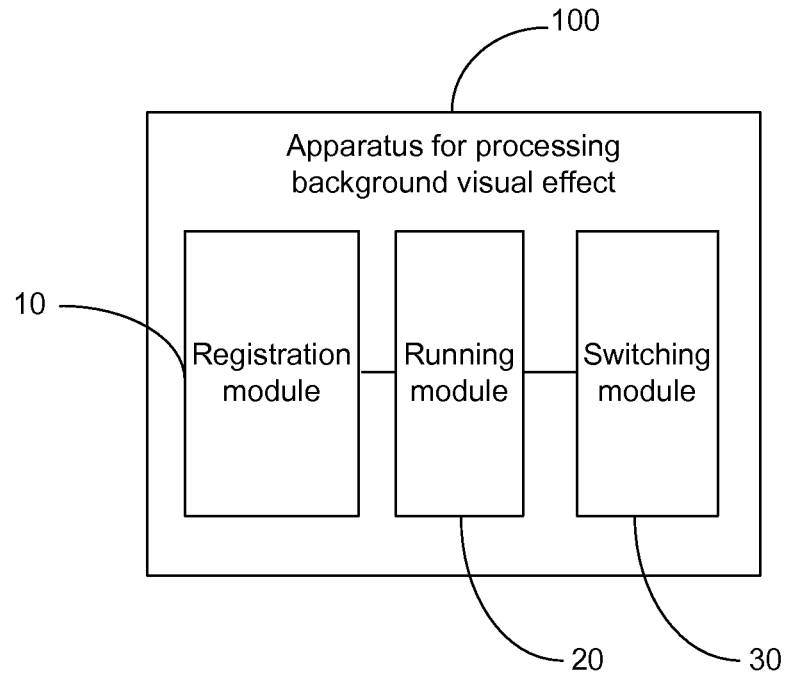
FIG. 8 is a diagram showing the structure of an apparatus for processing a background visual effect in an embodiment of the disclosure.

See FIG. 8, an apparatus 100 for processing a background visual effect is disclosed in an embodiment of the disclosure, including a registration module 10, a running module 20 and a switching module 30, wherein the registration module 10 is configured to register dependence resources, running parameters and handlers corresponding to respective visual effect modes of a background; the running module 20 is configured to select a visual effect mode corresponding to the background according to a running instruction and initialize the dependence resources, the running parameters and the handlers corresponding to the selected visual effect mode to control the background to enter the running status of the selected visual effect mode; and the switching module 30 is configured to switch the current running visual effect mode of the background according to a received switching instruction.

The switching instruction is generated according to switching information input by a user or according to switching information received wirelessly.

In the embodiment of an apparatus 100 for processing a background visual effect, the dependence resources, the running parameters and the handlers corresponding to respective visual effect modes of the background are registered, and thus when a certain visual effect mode of the background runs, the certain visual effect mode of the background can be switched according to the requirements of a user, so that background visual effects can be shared in different scenarios and the effect of user experience can be improved.

Furthermore, in the embodiment of an apparatus 100 for processing a background visual effect, the registration module 10 may be specifically configured to acquire dependence resources corresponding to respective visual effect modes of the background and add the dependence resources to a dependence resource list maintained by a system memory, acquire running parameters corresponding to respective visual effect modes of the background and add the running parameters to a running parameter list maintained by the system memory, and acquire handlers corresponding to respective visual effect modes of the background and add the handlers to a handler list maintained by the system memory.

In the embodiment of a method for processing a background visual effect, when a dependence resource corresponding to a certain visual effect modes already exists in the dependence resource list, it is unnecessary to acquire dependence resource again and add the dependence resource to the dependence resource list. Similarly, when a running parameter corresponding to the certain visual effect mode already exists in the running parameter list, it is unnecessary to acquire the running parameter again and add the running parameter to the running parameter list; and when a handler corresponding to the certain visual effect mode already exists in the handler list, it is unnecessary to acquire the handler again and add the handler to the handler list. Namely, before the dependence resource, the running parameter and the handler are acquired, it is necessary to judge whether the corresponding dependence resource, running parameter and handler to be acquired exist in the corresponding lists.

Furthermore, in the embodiment of an apparatus 100 for processing a background visual effect, the process that the registration module 10 registers the dependence resources, the running parameters and the handlers corresponding to respective visual effect modes of the background specifically includes that: firstly, whether a dependence resource corresponding to a visual effect mode to be registered for the background exists in the dependence resource list is judged; if not exist, a dependence resource corresponding to the visual effect mode is acquired through a user parameter and is added to the dependence resource list, and if exist, the second step is executed directly. Secondly, whether a running parameter corresponding to a visual effect mode to be registered for the background exists in the running parameter list is judged; if not exist, the running parameter corresponding to the visual effect mode is acquired through a user parameter and is added to the running parameter list; and if exist, the third step is executed directly. Thirdly, whether a handler corresponding to a visual effect mode to be registered for the background exists in the handler list is judged; if not exist, the handler corresponding to the visual effect mode is acquired through a user parameter and is added to the handler list; and if exist, the registration flow is ended directly.

Figure 9:
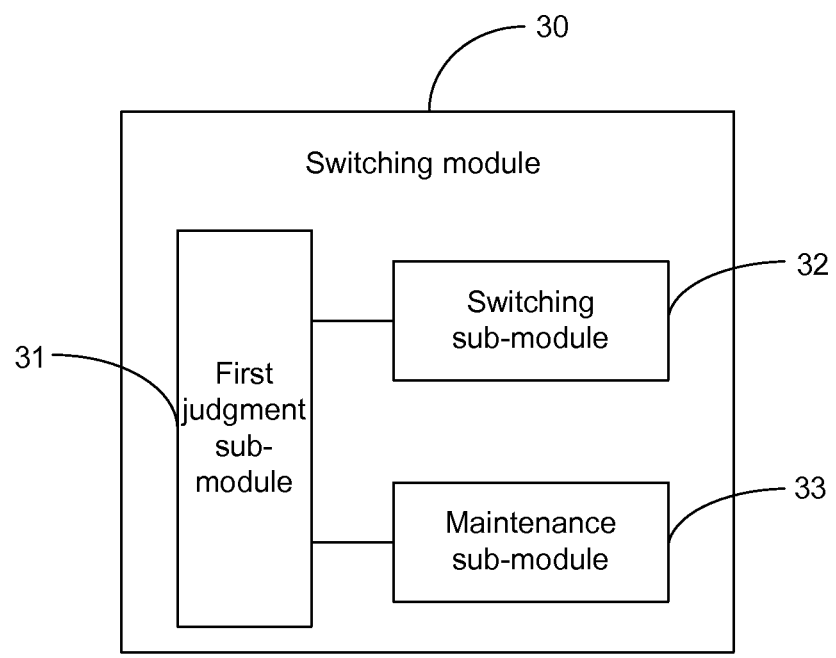
FIG. 9 is another diagram showing the structure of an apparatus for processing a background visual effect in an embodiment of the disclosure.

See FIG. 9, the switching module 30 includes a first judgment sub-module 31, a switching sub-module 32 and a maintenance sub-module 33, wherein the first judgment sub-module 31 is configured to judge whether a target visual effect mode of a background is available according to a received switching instruction; the switching sub-module 32 is configured to switch the original visual effect mode currently running to the target visual effect mode when the target visual effect mode is available; and the maintenance sub-module 33 is configured to set an unavailable flag for the target visual effect mode and maintain the running status of the original visual effect mode when the target visual effect mode is unavailable.

In the embodiment of a method for processing a background visual effect, when a visual effect mode is switched, a corresponding switching operation is carried out according to a switching instruction, so that the workload of a user is reduced, the automation of switching between visual effect modes of the background is implemented and the effect of user experience is improved in comparison with the existing switching between background visual effects.

Furthermore, in the embodiment of an apparatus 100 for processing a background visual effect, the switching sub-module 32 is specifically configured to terminate the original visual effect mode and start and run the target visual effect mode when the original visual effect mode currently running is available, and to start and run the target visual effect mode when the original visual effect mode currently running is unavailable.

Furthermore, the process that the switching sub-module 32 terminates the original visual effect mode may specifically include that: a termination instruction is generated and whether the termination instruction is correct is judged, and if correct, the original visual effect mode is stopped according to the termination instruction. Then, the binary mirror image file of the resource in the file system is opened and whether the opening is successful is judged; if the opening is successful, the dependence resource, the running parameter and the handler corresponding to the original visual effect mode are acquired from a system memory according to the binary mirror image file of the resource and are synchronized to the file system. Then, the dependence resource, the running parameter and the handler corresponding to the original visual effect mode are cleared from the system memory.

A first parameter of a background visual effect is maintained in the system memory and may include a first parameter of each visual effect mode. The first parameter of each visual effect mode includes the following contents: an original image path of a resource, a binary mirror image path of the resource, an image type of the resource and the variety of a handler corresponding to the visual effect mode. When the background visual effect mode currently running needs to be terminated, the system acquires the first parameter of the original visual effect mode currently running and generates a termination instruction according to the first parameter of the original visual effect mode.

The binary mirror image file of the resource includes the address of an original handler, and the addresses of the dependence resource and running parameter corresponding to the original handler.

Furthermore, the process that the switching sub-module 32 starts a target visual effect mode may include that: a start instruction is generated and whether the start instruction is correct is judged; if it is correct, a corresponding binary mirror image file of a resource in the file system is opened according to the start instruction and whether the opening is successful is judged. If the opening is successful, the dependence resource, the running parameter and the handler corresponding to the target visual effect mode are read from the file system according to the binary mirror image file of the resource and are synchronized to the corresponding addresses in the system memory. Then, the handler corresponding to the target visual effect mode is started according to the dependence resource and the running parameter in the system memory.

A first parameter of a background visual effect is maintained in the system memory and includes a first parameter of each visual effect mode, wherein the first parameter of each visual effect mode includes the following contents: an original image path of a resource, a binary mirror image path of the resource, an image type of the resource and the variety of a handler corresponding to the visual effect mode. Before the start instruction is executed, a user selects a visual effect mode in the first parameter of a background visual effect and then selects a handler and the image path of the resource, the binary mirror image path of the resource and the image type of the resource corresponding to the handler in the visual effect mode, and the system generates a start instruction according to the selection of the user.

The binary mirror image file of the resource includes the address of a target handler, and the addresses of the dependence resource and running parameter corresponding to the target handler in the system memory.

In the embodiment of a method for processing a background visual effect, the background visual effect includes various visual effect modes each including a plurality of handlers. Running a visual effect mode is essentially to run a specific handler in the visual effect mode. Switching a visual effect mode is essentially to switch a handler currently running in a visual effect mode to a handler in another visual effect mode.

A visual effect mode corresponds to a plurality of visual effect objects each including one handler and the running parameter and the dependence resource corresponding to the handler.

Furthermore, in the embodiment of an apparatus 100 for processing a background visual effect, the running module 20 may be further configured to find and open the binary mirror image file of the resource corresponding to the selected visual effect mode in a file system and judge whether the opening is successful; if it is successful, the dependence resource, the running parameter and the handler corresponding to the selected visual effect mode in the system memory are synchronized to the file system; and if not, the dependence resource, the running parameter and the handler corresponding to the selected visual effect mode are cleared from the system memory.

The binary mirror image file of the resource includes the address of a target handler, and the addresses of the dependence resource and running parameter corresponding to the target handler in the system memory.

Figure 10:
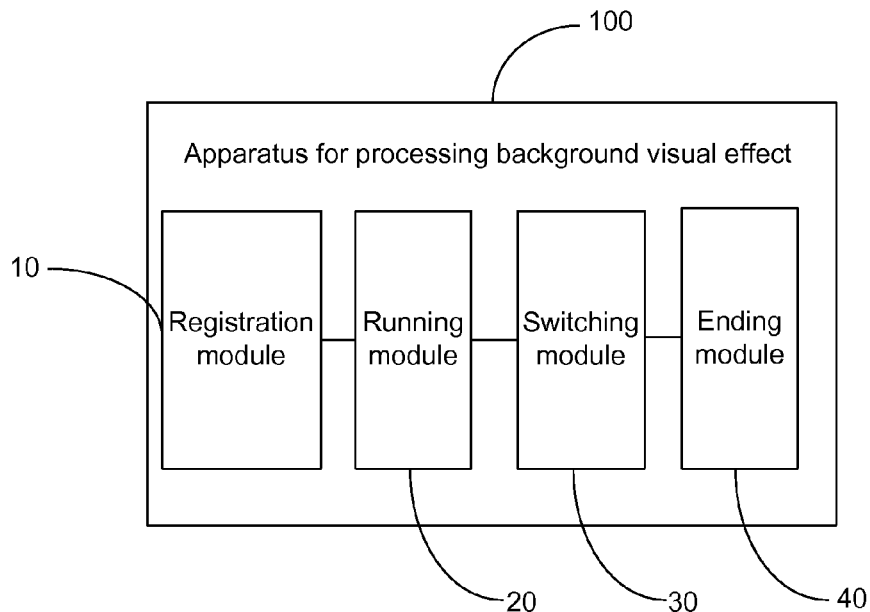
FIG. 10 is still another diagram showing the structure of an apparatus for processing a background visual effect in an embodiment of the disclosure.

Furthermore, see FIG. 10, in the embodiment of an apparatus 100 for processing a background visual effect, an ending module 40 may be further included. The ending module 40 is configured to receive an instruction for ending the running of a visual effect mode and judge whether the ending instruction is correct; if it is not correct, failure information is generated; if it is correct, a binary mirror image file of a resource corresponding to the visual effect mode in a file system is opened and whether the opening is successful is judged; if the opening is failed, failure information is generated; if the opening is successful, the dependence resource, the running parameter and the handler corresponding to the visual effect mode are acquired from a system memory according to the binary mirror image file of the resource and are synchronized to the file system; the dependence resource, the running parameter and the handler corresponding to the visual effect mode are cleared from the system memory; and finally, a flag is generated for indicating that the visual effect mode is to unavailable.

The binary mirror image file of the resource includes the address of a target handler, and the addresses of the dependence resource and running parameter corresponding to the target handler in the system memory.

As can be seen from the above, in the embodiment of an apparatus 100 for processing a background visual effect provided by the disclosure, background visual effects can be shared in different scenarios and the effect of user experience is improved.

Figure 11:
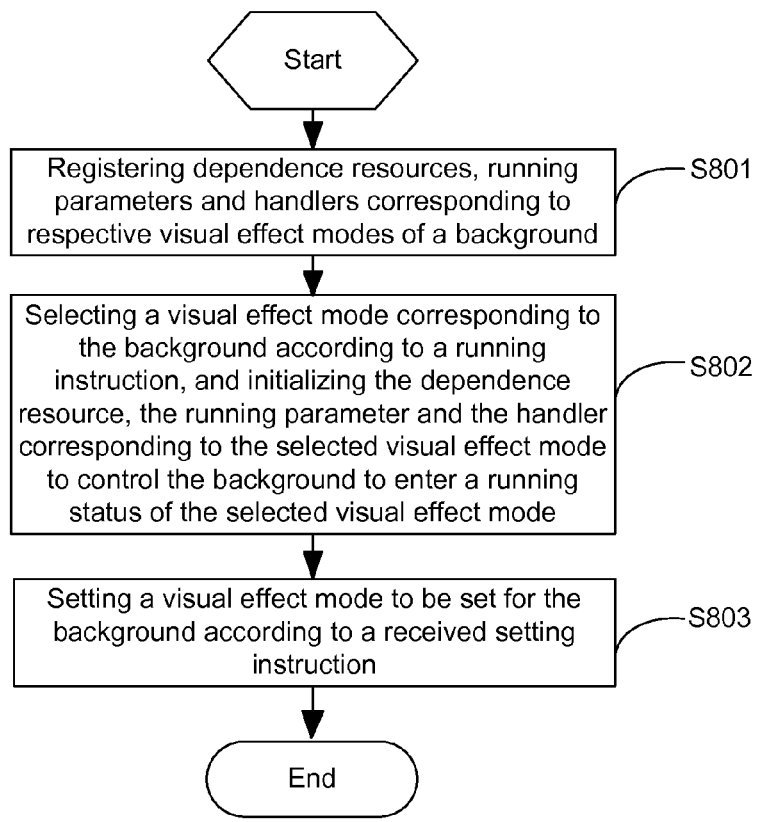
FIG. 11 is a flowchart of another method for processing a background visual effect in an embodiment of the disclosure.

See FIG. 11, another method for processing a background visual effect is provided in an embodiment of the disclosure, including that:

Step S801: dependence resources, running parameters and handlers corresponding to respective visual effect modes of a background are registered;

Step S802: a visual effect mode corresponding to the background is selected according to a running instruction, and the dependence resource, the running parameter and the handler corresponding to the selected visual effect mode are initialized to control the background to enter a running status of the selected visual effect mode; and Step S803: a visual effect mode to be set for the background is set according to a received setting instruction.

The running instruction is generated according to running information input by a user or according to running information received wirelessly. The setting instruction is generated according to setting information input by a user or according to setting information received wirelessly.

Furthermore, in the embodiment of a method for processing a background visual effect, Step S801 specifically includes that: the dependence resources corresponding to respective visual effect modes of the background are acquired and are added to a dependence resource list maintained by a system memory, the running parameters corresponding to respective visual effect modes of the background are acquired and are added to a running parameter list maintained by the system memory, and the handlers corresponding to respective visual effect modes of the background are acquired and are added to a handler list maintained by the system memory.

In the embodiment of a method for processing a background visual effect, when a dependence resource corresponding to a certain visual effect mode already exists in the dependence resource list, it is unnecessary to acquire the dependence resource again and add the dependence resource to the dependence resource list. Similarly, when a running parameter corresponding to the certain visual effect mode already exists in the running parameter list, it is unnecessary to acquire the running parameter again and add the running parameter to the running parameter list; and when a handler corresponding to the certain visual effect mode already exists in the handler list, it is unnecessary to acquire the handler again and add the handler to the handler list. Namely, before a dependence resource, a running parameter and a handler are acquired, it is necessary to judge whether the corresponding dependence resource, running parameter and handler to be acquired exist in the corresponding lists. See FIG. 2, the specific processing is as follows:

Step S201: whether a dependence resource corresponding to a visual effect modes to be registered for the background exists in the dependence resource list is judged; if not exist, Step S202 is executed; and if exist, Step S204 is executed;

Step S202: the dependence resource corresponding to the visual effect mode is acquired by a user parameter;

Step S203: the dependence resource corresponding to the visual effect mode is added to the dependence resource list;

Step S204: whether a running parameter corresponding to the visual effect mode to be registered for the background exists in the running parameter list is judged; if not exist, Step S205 is executed; and if exist, Step S207 is executed;

Step S205: the running parameter corresponding to the visual effect mode is acquired by a user parameter;

Step S206: the running parameter corresponding to the visual effect mode is added to the running parameter list;

Step S207: whether a handler corresponding to the visual effect mode to be registered for the background exists in the handler list is judged; if not exist, Step S208 is executed; and if exist, the registration flow is ended;

Step S208: the handler corresponding to the visual effect mode is acquired by a user parameter; and Step S209: the handler corresponding to the visual effect mode is added to the handler maintenance list.

Figure 12:
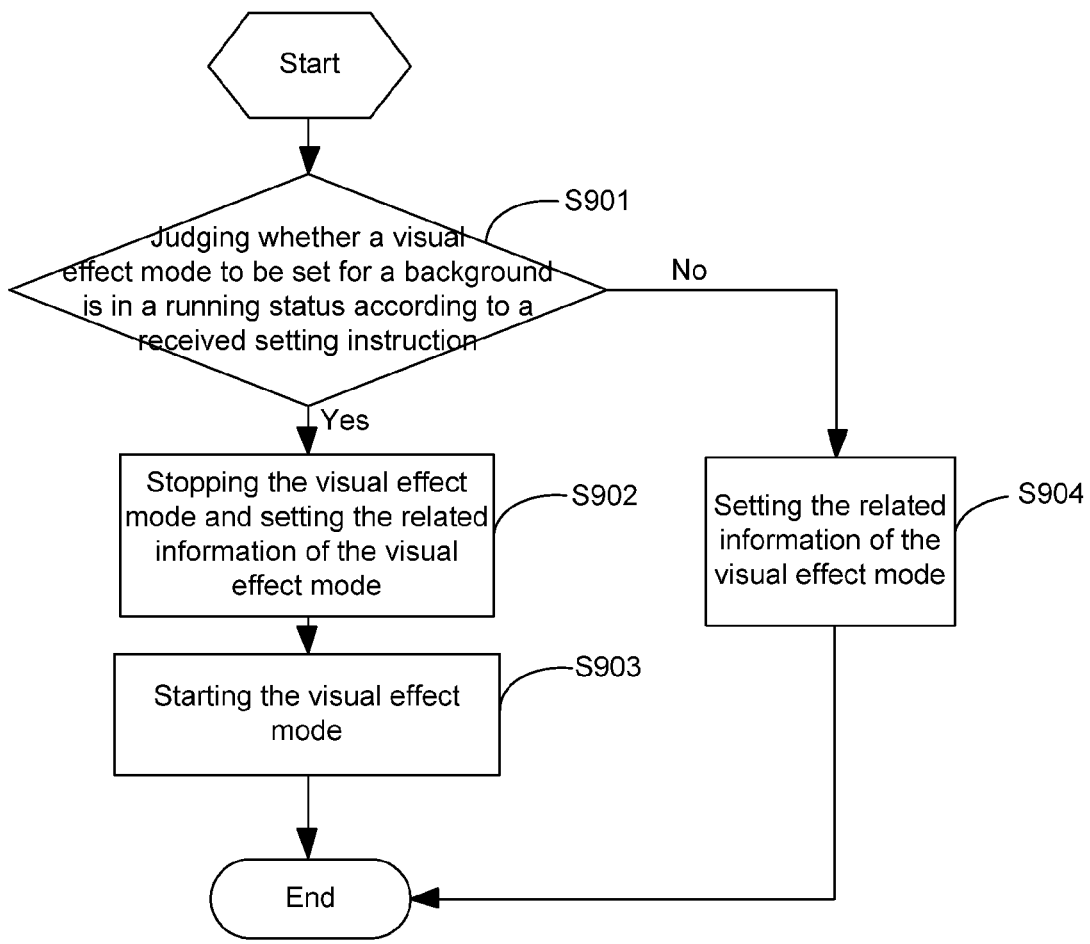
FIG. 12 is another flowchart of another method for processing a background visual effect in an embodiment of the disclosure.

Furthermore, see FIG. 12, in the embodiment of another method for processing a background visual effect, Step 803 may specifically include that:

Step S901: according to a received setting instruction, whether a visual effect mode to be set for a background is in a running status is judged; if it is in a running status, Step S902 is executed; and if not, Step S904 is executed;

Step S902: the visual effect mode is stopped and the related information of the visual effect mode is set;

Step S903: the visual effect mode is started; and

Step S904: the related information of the visual effect mode is set.

Each visual effect mode corresponds to a plurality of handlers, and when a visual effect mode runs, only one specific handler in the visual effect mode can run.

Setting the related information of the visual effect mode is essentially to select a specific handler in the visual effect mode, wherein when the visual effect mode is running, the related information of the visual effect mode is set, which is essentially to switch the current running handler of the visual effect mode to the handler corresponding to the set related information.

Furthermore, in the embodiment of a method for processing a background visual effect, the step that the related information of the visual effect mode is set may specifically include that:

if related information of the visual effect mode has been set already, the set related information is cleared at first, and then related information is set for the visual effect mode again according to a setting instruction.

The related information of the visual effect mode includes visual effect object information corresponding to the visual effect mode and first parameter information of the visual effect mode.

The visual effect object corresponding to the visual effect mode includes: dependence resource, running parameter and handler corresponding to the visual effect mode. The dependence resource corresponding to the visual effect mode includes a resource buffer and a resource operation set. The running parameter corresponding to the visual effect mode includes a running parameter buffer and a running parameter operation set.

The first parameter information of the visual effect mode includes an original image path of a resource, a binary mirror image path of the resource, an image type of the resource and the variety of a handler corresponding to the visual effect mode.

Furthermore, in the embodiment of a method for processing a background visual effect, after the related information of the visual effect mode is set, the method may further include that: whether the related information of the visual effect mode is set initially is judged; and if it is initially set, a flag is generated for indicating that the visual effect mode is initially set.

Furthermore, see FIG. 6, in the embodiment of a method for processing a background visual effect, after a visual effect mode of a background is run, the method may further include that:

Step S61: a binary mirror image file of the resource corresponding to the selected visual effect mode is found and is opened in a file system, and whether the opening is successful is judged; if successful, Step S621 is executed; and if not, Step S631 is executed;

the binary mirror image file of the resource includes the address of a target handler, and the addresses of the dependence resource and running parameter corresponding to the target handler in the system memory;

Step S621: the dependence resource, the running parameter and the handler corresponding to the selected visual effect mode in the system memory are synchronized to the file system;

Step S631: the dependence resource, the running parameter and the handler corresponding to the selected visual effect mode are cleared from the system memory.

In the embodiment of a method for processing a background visual effect, the background visual effect includes various visual effect modes and the running of each visual effect mode depends on the registration and the initialization of the corresponding visual effect mode; each visual effect mode includes a plurality of specific handlers; and running a visual effect mode is essentially to run a specific handler in the visual effect mode. Different handlers correspond to different related information.

Switching the visual effect mode is essentially to switch a specific handler between different visual effect modes. Setting the related information of the current running visual effect mode may be regarded as switching of internal handlers of a visual effect mode. After the visual effect mode is stopped, namely, a specific handler corresponding to the visual effect mode is stopped, and after the related information of the visual effect mode is set, the visual effect mode is restarted, which is essentially to run the handler corresponding to the set related information of the visual effect mode.

Furthermore, see FIG. 7, in the embodiment of a method for processing a background visual effect, when it is necessary to end a current running visual effect mode of a background, the method may specifically include that:

Step S701: an instruction is generated for ending the running of a visual effect mode and whether the ending instruction is correct is judged; if correct, Step S702 is executed; and if not, failure information is generated and the flow is ended;

Step S702: a binary mirror image file of a resource corresponding to the visual effect mode in a file system is opened, and whether the opening is successful is judged; if successful, Step S703 is executed; and if not, failure information is generated and the flow is ended;

the binary mirror image file of the resource includes the address of a target handler, and the addresses of the dependence resource and running parameter corresponding to the target handler in the system memory;

Step S703: the dependence resource, the running parameter and the handler corresponding to the visual effect mode are acquired from the system memory according to the binary mirror image file of the resource and are synchronized to the file system;

Step S704: the dependence resource, the running parameter and the handler corresponding to the visual effect mode are cleared from the system memory;

Step S705: a flag is generated for indicating that the visual effect mode is unavailable.

As can be seen from the above, in the embodiment of a method for processing a background visual effect, the dependence resources, the running parameters and the handlers corresponding to respective visual effect modes of the background are registered, and when a visual effect mode of the background runs, the running visual effect mode can be set according to the requirements of a user, namely, specific handlers in the same visual effect mode of the background can be switched, so the variety of background visual effects which can be implemented in the same scenario is enriched and the effect of user experience is improved.

Figure 13:
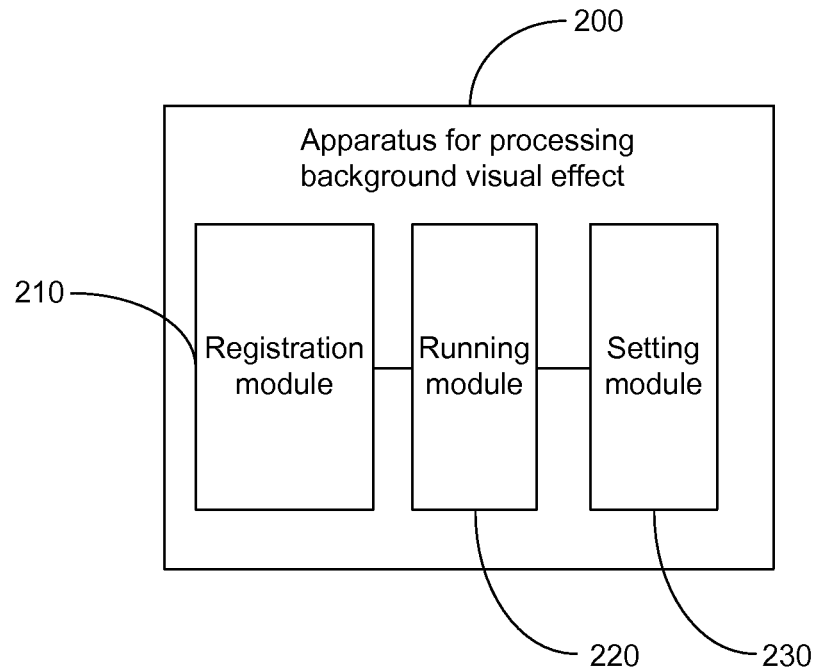
FIG. 13 is a diagram showing the structure of another apparatus for processing a background visual effect in an embodiment of the disclosure.

See FIG. 13, another apparatus 200 for processing a background visual effect is disclosed in an embodiment of the disclosure, including a registration module 210, a running module 220 and a setting module 230, wherein the registration module 210 is configured to register dependence resources, running parameters and handlers corresponding to respective visual effect modes of a background; the running module 220 is configured to select a visual effect mode corresponding to the background according to a running instruction and initialize the dependence resources, the running parameters and the handlers corresponding to the selected visual effect mode to control the background to enter the running status of the selected visual effect mode; and the setting module 230, which is configured to set a visual effect mode to be set for the background according to a received setting instruction.

The running instruction is generated according to running information input by a user or according to running information received wirelessly. The setting instruction is generated according to setting information input by a user or according to setting information received wirelessly.

Furthermore, in the embodiment of another apparatus 200 for processing a background visual effect, the registration module 210 may be specifically configured to acquire the dependence resources corresponding to respective visual effect modes of the background and add the dependence resources to a dependence resource list maintained by a system memory, to acquire the running parameters corresponding to respective visual effect modes of the background and add the running parameters a running parameter list maintained by the system memory, and to acquire the handlers corresponding to respective visual effect modes of the background and add the handlers to a handler list maintained by the system memory.

In the embodiment of a method for processing a background visual effect, when a dependence resource corresponding to a certain visual effect mode already exists in the dependence resource list, it is unnecessary to acquire the dependence resource again and add the dependence resource to the dependence resource list. Similarly, when a running parameter corresponding to the certain visual effect mode already exists in the running parameter list, it is unnecessary to acquire the running parameter again and add the running parameter to the running parameter list; and when a handler corresponding to the certain visual effect mode already exists in the handler list, it is unnecessary to acquire the handler again and add the handler to the handler list. Namely, before a dependence resource, a running parameter and a handler are acquired, it is necessary to judge whether the corresponding dependence resource, running parameter and handler to be acquired exist in the corresponding lists.

Furthermore, in the embodiment of an apparatus 200 for processing a background visual effect, the process that the registration module 210 registers the dependence resources, the running parameters and the handlers corresponding to respective visual effect modes of the background specifically includes that: firstly, whether the dependence resources corresponding to the visual effect modes of the background to be registered exist is judged; and if not exist, the dependence resources corresponding to the visual effect modes are acquired through user parameters and are added to the dependence resource list; if exist, the second step is executed. Secondly, whether the running parameters corresponding to the visual effect modes to be registered for the background exist is judged; if not exist, the running parameters corresponding to the visual effect modes are acquired through user parameters and are added to the running parameter list; and if exist, the third step is executed directly. Thirdly, whether the handlers corresponding to the visual effect modes to be registered for the background exist is judged; if not exist, the handlers corresponding to the visual effect modes are acquired through user parameters and are added to the handler maintenance list; and if exist, the registration flow is ended directly.

Figure 14:
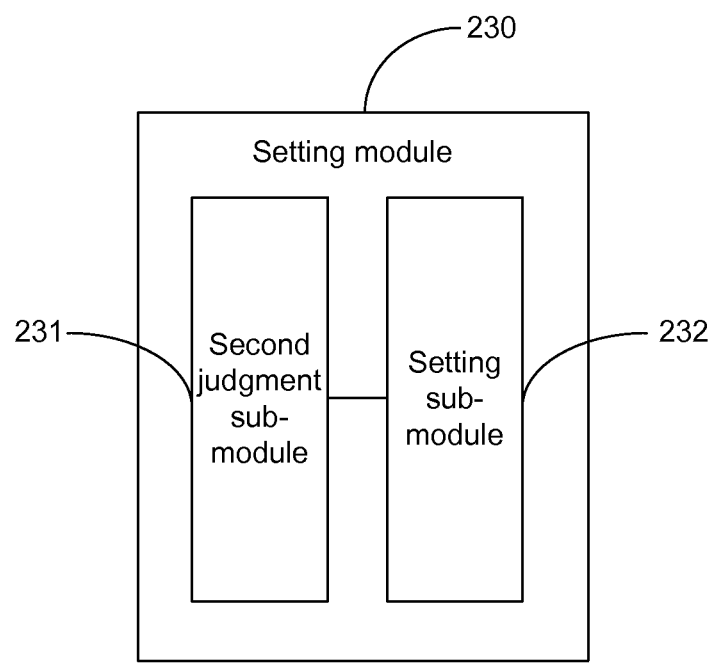
FIG. 14 is another diagram showing the structure of another apparatus for processing a background visual effect in an embodiment of the disclosure.

Furthermore, see FIG. 14, in the embodiment of an apparatus 200 for processing a background visual effect, the setting module 230 may further include a second judgment sub-module 231 and a setting sub-module 232, wherein the second judgment sub-module 231 is configured to judge whether the visual effect mode to be set for the background is in a running status according to a received setting instruction; and the setting sub-module 232 is configured to stop the visual effect mode, set the related information of the visual effect mode and start the visual effect mode when the visual effect mode is in a running status, and set the related information of the visual effect mode when the visual effect mode is in a non-running status.

Each visual effect mode corresponds to a plurality of handlers, and when a visual effect mode runs, only one specific handler in the visual effect mode can run.

Setting the related information of the visual effect mode is essentially to select a specific handler for the visual effect mode, wherein when the visual effect mode is running, the related information of the visual effect mode is set, namely, the current running handler of the visual effect mode is switched to the handler corresponding to the set related information.

Furthermore, in the embodiment of a method for processing a background visual effect, the step that the related information of the visual effect mode is set may specifically include that:

if related information of the visual effect mode has been set already, the set related information is cleared at first, and then related information of the visual effect mode is set again according to a setting instruction.

The related information of the visual effect mode includes visual effect object information corresponding to the visual effect mode and first parameter information of the visual effect mode.

The visual effect object corresponding to the visual effect mode includes: dependence resources, running parameters and handlers corresponding to the visual effect modes. The dependence resources corresponding to the visual effect modes include a resource buffer and a resource operation set. The running parameters corresponding to the visual effect modes include a running parameter buffer and a running parameter operation set.

The first parameter information of the visual effect mode includes an original image path of a resource, a binary mirror image path of the resource, an image type of the resource and the variety of a handler corresponding to the visual effect mode.

Figure 15:
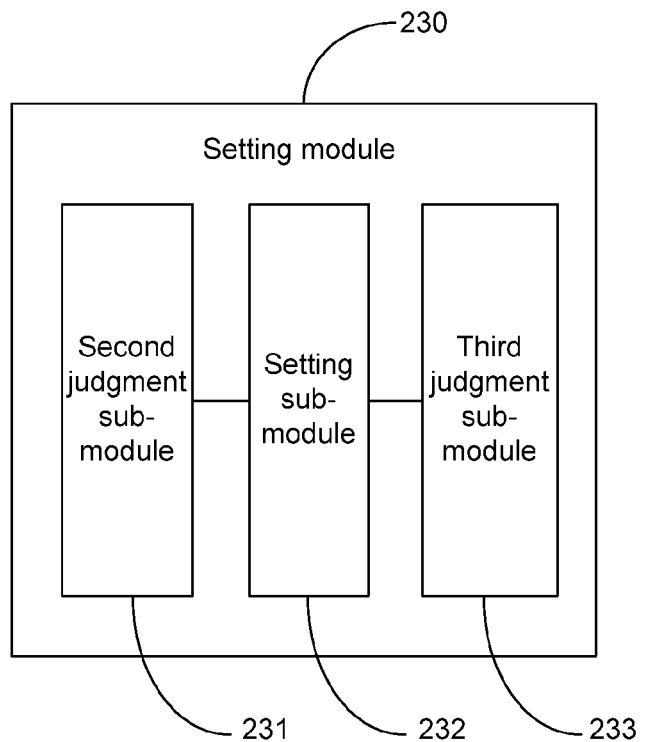
FIG. 15 is another diagram showing the structure of another apparatus for processing a background visual effect in an embodiment of the disclosure.

Furthermore, see FIG. 15, in the embodiment of an apparatus 200 for processing a background visual effect, the setting module 230 may further include a third judgment sub-module 233, wherein the third judgement sub-module 233 is configured to judge whether the related information of the visual effect mode is set initially; and if the related information of the visual effect mode is set initially, a flag indicative of initial setting is generated for the visual effect mode by a setting control module.

Furthermore, in the embodiment of an apparatus 200 for processing a background visual effect, the running module 220 may be further configured to find and open the binary mirror image file for the resource corresponding to the selected visual effect mode in a file system and judge whether the opening is successful; if it is successful, the dependence resource, the running parameter and the handler corresponding to the selected visual effect mode in the system memory are synchronized to the file system; and if not, the dependence resource, the running parameter and the handler corresponding to the selected visual effect mode are cleared from the system memory.

The binary mirror image file of the resource includes the address of a target handler, and the addresses of the dependence resource and the running parameter corresponding to the target handler in the system memory.

In the embodiment of a method for processing a background visual effect, the background visual effect includes various visual effect modes and the running of each visual effect mode depends on the registration and initialization of the corresponding visual effect mode; each visual effect mode includes a plurality of specific handlers; and running a visual effect mode is essentially to run a specific handler in the visual effect mode. Different handlers correspond to different related information.

Switching a visual effect mode is essentially to switch a specific handler between different visual effect modes. Setting the related information of the current running visual effect mode may be regarded as switching of internal handlers of a visual effect mode; after the visual effect mode is stopped, namely, a specific handler corresponding to the visual effect mode is stopped, and after the related information of the visual effect mode is set, restarting the visual effect mode is essentially to run the handler corresponding to the set related information of the visual effect mode.

Figure 16:
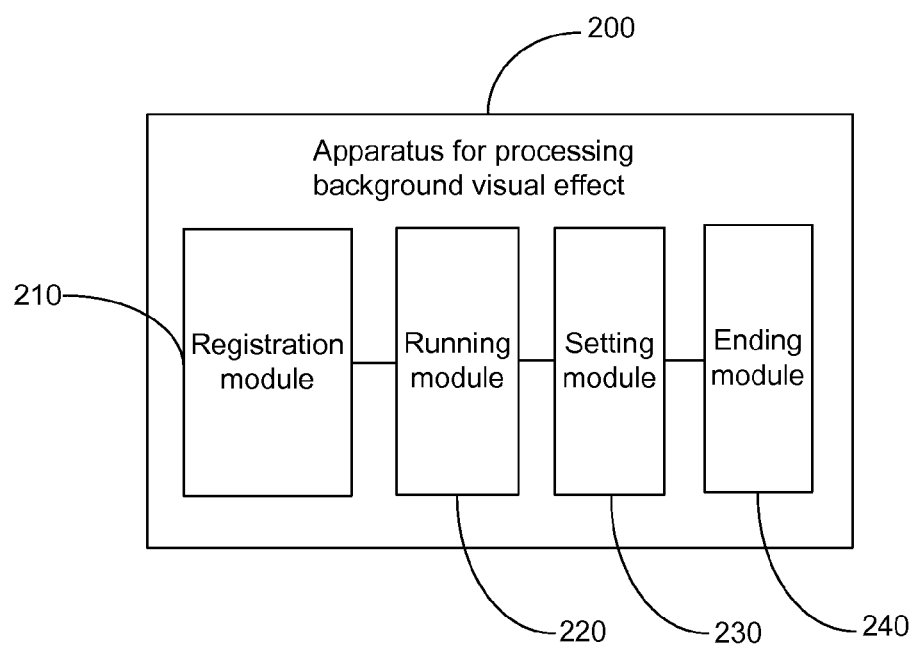
FIG. 16 is another diagram showing the structure of another apparatus for processing a background visual effect in an embodiment of the disclosure.

Furthermore, see FIG. 16, in the embodiment of an apparatus 200 for processing a background visual effect, an ending module 240 may be further included. The ending module 240 is configured to receive an instruction for ending the running of a visual effect mode and judge whether the ending instruction is correct; if it is not correct, failure information is generated; if it is correct, a binary mirror image file of a resource corresponding to the visual effect mode in a file system is opened and whether the opening is successful is judged; if the opening is failed, failure information is generated; if the opening is successful, the dependence resource, the running parameter and the handler corresponding to the visual effect mode are acquired from a system memory according to the binary mirror image file of the resource and are synchronized to the file system; the dependence resource, the running parameter and the handler corresponding to the visual effect mode are cleared from the system memory; and finally, a flag indicative of unavailability is generated for the visual effect mode.

The binary mirror image file of the resource includes the address of a target handler, and the addresses of the dependence resource and the running parameter corresponding to the target handler in the system memory.

As can be seen from the above, in the embodiment of an apparatus 200 for processing a background visual effect provided by the disclosure, the dependence resources, the running parameters and the handlers corresponding to respective visual effect modes of the background are registered, and when a visual effect mode of a background runs, the running visual effect mode can be set according to the requirements of a user, namely, specific handlers can be switched in the same visual effect mode of the background, so the variety of background visual effects which can be implemented in the same scenario is enriched and the effect of user experience is improved.

It should be understood that the above are only embodiments of the disclosure, and are not intended to limit the scope of patent of the disclosure. All the equivalent structures or equivalent flow changes made by the description and the drawings of the disclosure are directly or indirectly applied to the field of other related arts and are also within the scope of the patent protection of the disclosure.

INDUSTRIAL APPLICABILITY

Through the method and the apparatus for processing a background visual effect, background visual effects can be shared in different scenarios, the variety of background visual effects in the same scenario can be enriched and the effect of user experience is improved.

What is claimed is:

1. A method for processing a background visual effect, comprising:
registering dependence resources, running parameters and handlers corresponding to respective visual effect modes of a background;
selecting a visual effect mode corresponding to the background according to a running instruction, and initializing a dependence resource, a running parameter and a handler corresponding to the selected visual effect mode to control the background to enter a running status of the selected visual effect mode; and
switching a current running visual effect mode of the background according to a received switching instruction;
wherein the switching a current running visual effect mode of the background according to a received switching instruction specifically comprises:
judging whether a target visual effect mode of the background is available according to the received switching instruction;
if available, switching an original visual effect mode currently running to the target visual effect mode; and
if not available, setting a flag indicative of unavailability for the target visual effect mode and maintaining a running status of the original visual effect mode of the background;
wherein the switching an original visual effect mode currently running to the target visual effect mode specifically comprises:
when the original visual effect mode currently running is available, terminating the original visual effect mode and starting and running the target visual effect mode; and
when the original visual effect mode currently running is unavailable, starting the target visual effect mode.

2. The method for processing a background visual effect according to claim 1, wherein the registering dependence resources, running parameters and handlers corresponding to respective visual effect modes of a background specifically comprises:
acquiring the dependence resources corresponding to the respective visual effect modes of the background and adding the dependence resources to a dependence resource list maintained by a system memory;
acquiring the running parameters corresponding to the respective visual effect modes of the background and adding the running parameters to a running parameter list maintained by the system memory; and
acquiring the handlers corresponding to the respective visual effect modes of the background and adding the handlers to a handler list maintained by the system memory.

3. An apparatus for processing a background visual effect, comprising: a processor configured to be capable of executing programmed instructions comprising:
registering dependence resources, running parameters and handlers corresponding to respective visual effect modes of a background;
selecting a visual effect mode corresponding to the background according to a running instruction and initialize a dependence resource, a running parameter and a handler corresponding to the selected visual effect mode to control the background to enter a running status of the selected visual effect mode; and
switching a current running visual effect mode of the background according to a received switching instruction;
wherein the processor is also configured to be capable of executing programmed instructions further comprising:
judging whether a target visual effect mode of the background is available according to the received switching instruction;
switching an original visual effect mode currently running to the target visual effect mode when the target visual effect mode is available; and
setting a flag indicative of unavailability for the target visual effect mode and maintaining a running status of the original visual effect mode of the background when the target visual effect mode is unavailable;
the processor is also configured to be capable of executing programmed instructions further comprising:
terminating the original visual effect mode and starting and running the target visual effect mode when the original visual effect mode currently running is available; and
starting the target visual effect mode when the original visual effect mode currently running is unavailable.

4. A method for processing a background visual effect, comprising:
registering dependence resources, running parameters and handlers corresponding to respective visual effect modes of a background;
selecting a visual effect mode corresponding to the background according to a running instruction, and initializing a dependence resource, a running parameter and a handler corresponding to the selected visual effect mode to control the background to enter a running status of the selected visual effect mode; and
setting a visual effect mode to be set for the background according to a received setting instruction;
wherein the registering dependence resources, running parameters and handlers corresponding to respective visual effect modes of a background specifically comprises:
acquiring the dependence resources corresponding to the respective visual effect modes of the background and adding the dependence resources to a dependence resource list maintained by a system memory;
acquiring the running parameters corresponding to the respective visual effect modes of the background and adding the running parameters to a running parameter list maintained by the system memory; and
acquiring the handlers corresponding to the respective visual effect modes of the background and adding the handlers to a handler list maintained by the system memory;
the setting a visual effect mode to be set for the background according to a received setting instruction specifically comprises:
judging whether the visual effect mode to be set is in a running status according to the received setting instruction;
if in a running status, stopping the visual effect mode and setting related information of the visual effect mode;
starting the visual effect mode; and
if not in a running status, setting the related information of the visual effect mode;
wherein after setting the related information of the visual effect mode, the method further comprises:

judging whether the related information of the visual effect mode is set initially; and;

if set initially, generating a flag indicative of initial setting for the visual effect mode.

5. An apparatus for processing a background visual effect, comprising: a processor configured to be capable of executing programmed instructions comprising:

registering dependence resources, running parameters and handlers corresponding to respective visual effect modes of a background;

selecting a visual effect mode corresponding to the background according to a running instruction and initializing a dependence resource, a running parameter and a handler corresponding to the selected visual effect mode to control the background to enter a running status of the selected visual effect mode; and setting a visual effect mode to be set for the background according to a received setting instruction;

wherein the processor is also configured to be capable of executing programmed instructions further comprising:

acquiring the dependence resources corresponding to the respective visual effect modes of the background and adding the dependence resources to a dependence resource list maintained by a system memory;

acquiring the running parameters corresponding to the respective visual effect modes of the background and adding the running parameters to a running parameter list maintained by the system memory; and acquiring the handlers corresponding to the respective visual effect modes of the background and adding the handlers to a handler list maintained by the system memory;

the processor is also configured to be capable of executing programmed instructions further comprising:

judging whether the visual effect mode to be set is in a running status according to the received setting instruction; and stopping the visual effect mode, setting related information of the visual effect mode and starting the visual effect mode when the visual effect mode is in a running status, and setting the related information of the visual effect mode when the visual effect mode is in a non-running status;

the processor is also configured to be capable of executing programmed instructions further comprising:

judging whether the related information of the visual effect mode is set initially, and if the related information of the visual effect mode is set initially, generating a flag indicative of initial setting for the visual effect mode.

* * * * *